(12) United States Patent
Ehbing et al.

(10) Patent No.: US 7,138,077 B2
(45) Date of Patent: Nov. 21, 2006

(54) PROCESS AND INSTALLATION FOR THE PRODUCTION OF FOAM IN A CONTINUOUS SLABSTOCK FOAM PROCESS

(75) Inventors: Hubert Ehbing, Odenthal (DE); Holger Zien, Köln (DE); Karl-Heinz Dörner, Pulheim (DE); Christian Beck, Burscheid-Hilgen (DE); Hans Frei, Jona (CH)

(73) Assignee: Bayer MaterialScience AG, Leverkusen (DE)

( * ) Notice: Subject to any disclaimer, the term of this patent is extended or adjusted under 35 U.S.C. 154(b) by 231 days.

(21) Appl. No.: 10/638,590

(22) Filed: Aug. 11, 2003

(65) Prior Publication Data
US 2004/0065973 A1 Apr. 8, 2004

(30) Foreign Application Priority Data
Aug. 13, 2002 (DE) ................................ 102 37 005

(51) Int. Cl.
*B29C 44/20* (2006.01)
*B29C 44/60* (2006.01)

(52) U.S. Cl. .................... 264/40.4; 264/45.8; 425/4 C; 425/140; 425/141; 425/817 C

(58) Field of Classification Search ................ 264/40.4, 264/45.8; 425/4 C, 817 C, 140, 141
See application file for complete search history.

(56) References Cited

U.S. PATENT DOCUMENTS

| 3,706,516 | A | | 12/1972 | Kisteneich et al. .......... 425/141 |
| 3,786,122 | A | * | 1/1974 | Berg ........................... 264/46.2 |
| 4,102,621 | A | * | 7/1978 | Talbert ........................ 425/224 |
| 4,131,660 | A | * | 12/1978 | Jacobs ......................... 264/406 |
| 4,244,897 | A | | 1/1981 | Moon .......................... 264/40.2 |
| 4,422,988 | A | * | 12/1983 | Kornylak ..................... 264/40.3 |
| 4,540,717 | A | * | 9/1985 | Mahnke et al. ................ 521/52 |
| 4,832,885 | A | * | 5/1989 | Gross ......................... 264/40.6 |
| 4,839,666 | A | | 6/1989 | Jayne |
| 4,877,564 | A | * | 10/1989 | Gross ......................... 264/40.6 |
| 5,203,923 | A | | 4/1993 | Hartman |
| 5,272,543 | A | | 12/1993 | Yanagisawa |
| 5,273,059 | A | | 12/1993 | Gross et al. |
| 5,642,948 | A | | 7/1997 | Harris et al. |
| 5,698,609 | A | * | 12/1997 | Lockwood et al. ......... 521/173 |
| 5,707,689 | A | | 1/1998 | Hori |
| 5,968,271 | A | | 10/1999 | Maxwell et al. |
| 6,369,906 | B1 | | 4/2002 | Nakao |

FOREIGN PATENT DOCUMENTS

| DE | 28 19 709 | 10/1979 |
| GB | 1 235 915 | 6/1971 |

OTHER PUBLICATIONS

Kunststaffberater 38(6), (month unavailable) 1993, pp. 11 & 12, "Qualität gibt den Takt an".
Urethanes Technology, Aug./Sep. 1991, pp. 25 & 27, "Ultrasonics for foam measurements: a quality control tool for PU foams" by Dr. Ing. Dirk Wehrhahn.

(Continued)

*Primary Examiner*—Allan R. Kuhns
(74) *Attorney, Agent, or Firm*—Joseph C. Gil; Lyndanne M. Whalen

(57) ABSTRACT

The invention relates to an installation and a process for the production of foam in a continuous block foam process in which the height of a foam-forming mixture along a conveyor is measured and a correcting variable as a function of deviation of the actual height risen from the standard height is determined.

44 Claims, 6 Drawing Sheets

OTHER PUBLICATIONS

Kunststoffe, 86, (month unavailable) 1996, pp. 858-860, "Qualitätssicherung von PUR-Schaumstoffen" by B. Hofmann und J. Albertz.
Journal of Cellular Plastics, Jan./Feb. 1983, pp. 61-64, "Flexible Polyurethane Slabstock Foam: The Influence of Formulation, Climatic Conditions and Storage Conditions on Foam Properties" by Dr. R. Schiffauer and C. den Heijer.
Shell Petrochemicals, No. 5, (month unavailable) 1987, pp. 14-15, "An Expert Touch for PU Foam Production" by Philip Connolly.

* cited by examiner

PROCESS AND INSTALLATION FOR THE PRODUCTION OF FOAM IN A CONTINUOUS SLABSTOCK FOAM PROCESS

BACKGROUND OF THE INVENTION

The invention relates to a process and an installation for the production of foam in a continuous slabstock foam process, in particular the production of polyurethane foam.

The product quality of foams depends on a large number of environmental parameters and installation parameters. This applies in particular to the production of polyurethane foam. A mathematical model for the production of polyurethane foam which involves some of these parameters is known from Shell Petrochemicals, No. 5, 1987, page 14, "An Expert Touch for PU Foam Production", Philip Connolly.

Various parameters which are of importance for the production of polyurethane foam are known from Journal of CELLULAR PLASTICS, January/February 1983, "Flexible Polyurethane Slabstock Foam: The Influence of Formulation, Climatic Conditions and Storage Conditions on Foam Properties", Dr. R. Schiffauer and C. den Heijer. In particular, the marked dependence of the production process on environmental conditions, such as, for example, on the atmospheric pressure and the atmospheric humidity, can lead to a summer-winter effect in the production.

For quality assurance in the production of polyurethane foam it is known to analyze the properties of the starting substances and also to subject the end product to a comprehensive analysis. It is known from "Qualitätssicherung von PUR-Schaumstoffen, Prüfung des Steigverhaltens mit Ultraschall", B. Hofmann and J. Albertz, Kunststoffe 86 (1996) to determine the rising properties of the mixed starting substances by means of ultrasonic sensors. A similar process for quality control is known from "Ultrasonics for foam measurements: a quality control tool for PU foams", Dr. Ing. Dirk Wehrhahn, Urethanes Technology, August/September 1991. The pulse-echo method is used for the ultrasonic measurement.

Another measurement system for foam heights based on an ultrasonic measurement of distance is known from "Qualität gibt den Takt an", Kunststoffberater (1993), 38 (6), page 11. An alternative sensor principle based on a CCD camera is known from "Use of a charged coupled device (CCD) camera for evanescent wave optical fiber cure monitoring of liquid composite molding resins", Polym. Compos. (1977) 18 (4), pages 518–525. A sensor for measurement of the expansion of foam which determines the weight and the thickness of the foam is known from JP 103 29 160.

A process for the characterization of the foam produced is known from "Non-destructive characterization of microcellular foam structure. Error analysis of a proposed sensor", Annu. Tech. Conf. Soc. Plast. Eng. (1992), pages 1519–1526.

Various computer-assisted methods of quality assurance in the production of polyurethane foam have also been disclosed in, for example, from "Software to Manage a Continuous Production of Flexible Polyurethane Foams by Slabstock Technology", Salvatore Consoli, Journal of CELLULAR PLASTICS, volume 33, March 1997, page 102; "Foam Roadmap On-Line Answernostics", James D. Shoup, Polyurethane 1995, Sep. 26th–29th, 1995, pages 489, 490; and "Mathematical Property Prediction Models for Flexible Polyurethane Foams", Reinhart Schiffauer, Adv. Urethane Sci. Techn. 14 (1998), pages 1 to 44.

Expert systems for processing parameters during RIM processing are known from "Experten mit System, Prozesssteuerung des PUR-RRIM-Verfahrens zur Herstellung von Karosserieaußenteilen", F. Schnabel, Sulzbach, K. -H. Dörner, Kunststoffe, year 88, October,98; and "PUR-Teile kostengünstig fertigen, Stand der Polyurethan-RRIM-Technologie", Karl-Heinz Dörner, Hans Joachim Meiners, Hans-Joachim Ludwig, Kunststoffe, year 91, April,2001. These expert systems are said to be able to provide conclusions in respect of the product properties, process monitoring, quality assurance and preventive maintenance.

Various types of installations for the production of polyurethane slabstock foam and other foams are known from the prior art. Such installations are obtainable commercially from Hennecke GmbH, Birlinghovener Straße 30, 53754 Sankt Augustin, Germany, particularly installations for the production of slabstock flexible foam in continuous production. Such installations are also called slabstock foam installations.

Other types of slabstock foam installations known from the prior art include those disclosed in Planiblock, Draka-Petzetakis, Maxfoam and Vertifoam Edge Control (Kunststoffhandbuch; 7. Polyurethane; ed. Oertel, G.; Munich; Vienna; Hanser Verlag, 1993) and those suitable for the VPF (variable pressure foaming) process. Polyurethane flexible foam is also produced in a continuous rectangular process in these types of installations.

Various types of installations for the production of polyurethane in a continuous slabstock foam process are commercially obtainable from Cannon Viking, Manchester, England.

Various devices for the continuous production of polyurethane foam blocks are disclosed in DE 691 19 244 T2; DE 692 17 671 T2; and U.S. Pat. No. 4,492,664. Another apparatus for the production of polyurethane foam is known from DE 696 10 885 T2.

Various processes for the production of polyurethane foams on such installations are described, for example, in DE 381 99 40 A1; DE 196, 49, 829 A1; DE 431 5874 A1; and DE 195 06 671 C2.

SUMMARY OF THE INVENTION

The object of the present invention is to provide an improved process for the production of foam in a continuous slabstock foam process and an improved installation for the production of foam in such a process.

These objects of the invention are achieved by using a correction variable determined from foam height measurements to adjust the foam production process.

DETAILED DESCRIPTION OF THE INVENTION

Figure 1:
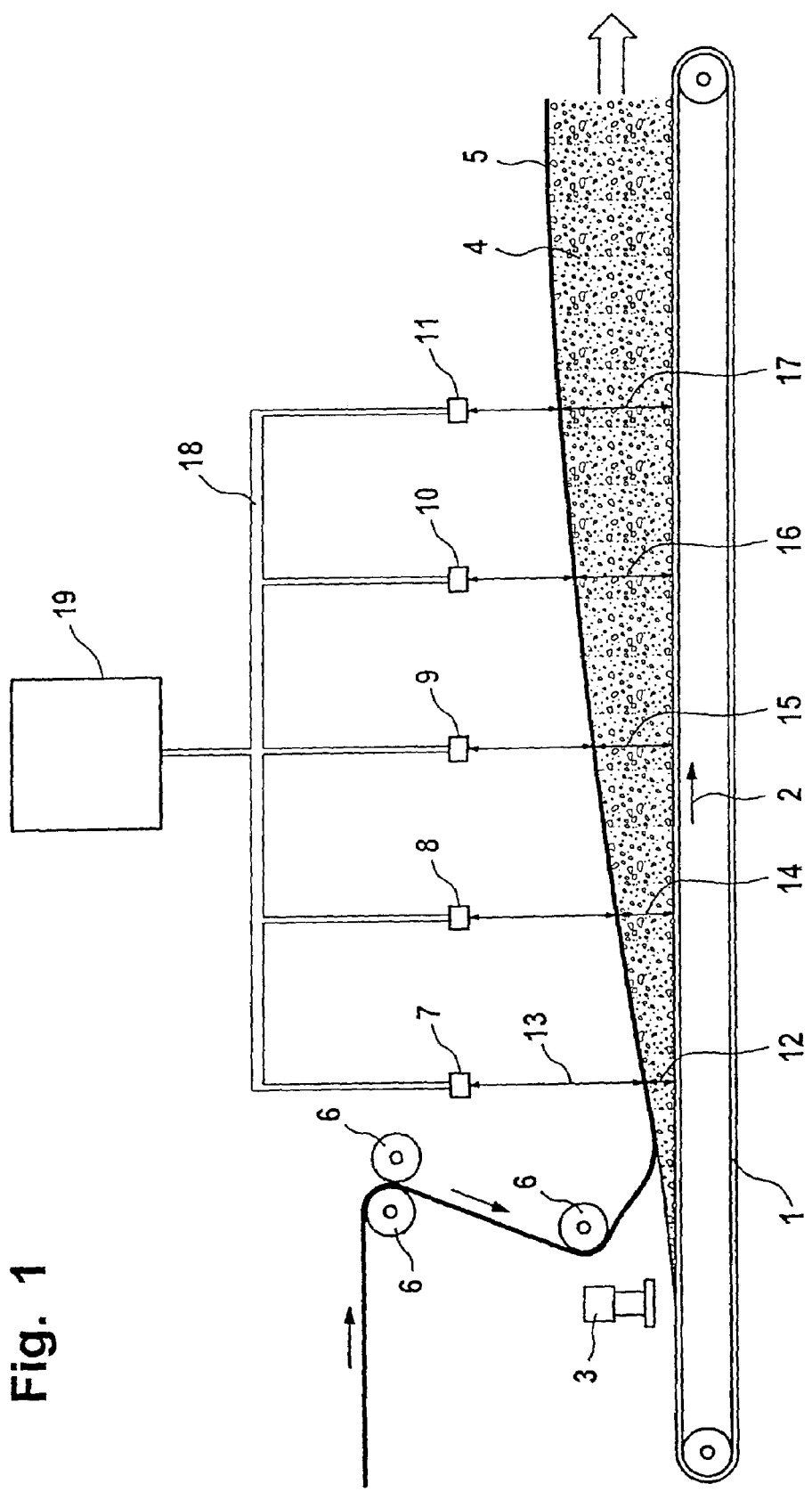
FIG. 1 illustrates a foam-forming apparatus which incorporates an installation within the scope of the present invention.

The present invention allows improved regulation of foam production in a continuous slabstock foam process by recording the actual heights risen at several points along the expansion region of the foam in the installation. The actual heights risen are compared with corresponding set heights to be risen (also referred to as "standard" height(s)). A correcting variable for re-adjustment of the process is determined from any deviation of the actual heights risen from the set heights to be risen.

It is of particular advantage that the present invention makes it possible during foam production to re-adjust the installation parameters and/or the composition of the starting material for the foam in order to arrive at a desired foam quality which is as constant as possible. As a result, variations in product properties, such as, for example, the density and the compressive strength of the foam, on the basis of varying process parameters and environmental conditions, such as, for example, the atmospheric pressure, are reduced. This has the further advantage that the time required for starting up the installation and the amount of waste are reduced.

According to a preferred embodiment of the invention, the production of the foam is carried out in an installation of the Hennecke, Planiblock, Draka-Petzetakis, Maxfoam, Vertifoam, Edge Control and VPF type. Such installations conventionally have a conveying device on which the expanding foam is moved in a conveying direction. In some cases, a so-called "fall plate" is present in the expansion region of the foam.

According to the invention, several height sensors are arranged along the conveying direction in the expansion region of the foam, in order to measure the actual heights risen at various points of the expansion region. Various sensor types can be employed here, such as, for example, ultrasonic sensors, light barriers, CCD cameras, capacitive sensors, inductive sensors, laser measurement systems or other sensors which allow a height measurement of the actual heights risen.

According to a preferred embodiment of the invention, a fitted curve is laid through the actual heights risen which have been measured and is compared with a set curve. For example, the difference in the gradients of the curves or the difference in the integrals of the curves in the expansion region is used as a basis for the determination of a correcting variable.

According to a preferred embodiment of the invention, the conveying speed of the expanded foam serves as the correcting variable. For example, if the actual heights risen are below the set heights to be risen, the conveying speed is decreased until the actual heights risen agree sufficiently with set heights to be risen.

According to a further preferred embodiment of the invention, the amount of material fed to the slabstock foam process per unit time serves as the correcting variable. For example, if the actual heights risen are below the set heights to be risen, the amount of material fed in per unit time is increased until the actual heights risen and the set heights to be risen agree sufficiently.

According to another preferred embodiment of the invention, the chemical composition of the material fed to the slabstock foam process serves as the correcting variable. For example, if the actual heights risen are below the set heights to be risen, the chemical composition is modified such that faster foaming of the foam occurs.

According to a further preferred embodiment of the invention, various correcting variables are determined on the basis of a deviation of the actual heights risen from the set heights to be risen, such as, for example, a change in the conveying speed, the amount of material fed in per unit time and/or the chemical composition of the material fed in.

According to another preferred embodiment of the invention, at least one product property of the resulting foam is predicted on the basis of the actual heights risen. A rigorous regression model can be used for this prediction. Alternatively or in addition, an artificial neuronal network or a hybrid neuronal network can be used for the prediction.

According to a preferred embodiment of the invention, the actual heights risen, the chemical composition of the material fed in and installations and/or environmental parameters can be fed to the artificial neuronal network as input parameters. On the basis of these, the artificial neuronal network predicts at least one product property, such as, for example, the density or the compressive strength.

For training such an artificial neuronal network, a series of experiments can be conducted in order to measure a product property to be predicted on variation of the input parameters. On the basis of the data determined in this way, the artificial neuronal network is then trained, that is to say the actual parameters, heights risen, composition, installations and/or environmental parameters are entered into the artificial neuronal network. The product property predicted by the artificial neuronal network is compared with the product property actually measured. On the basis of the difference between the product property predicted and the actual product property, adaptation of the weighting of the neurons, that is to say training of the artificial neuronal network, takes place.

Alternatively or in addition, this training of the artificial neuronal network can also take place while production is running. That is to say that no series of experiments is conducted, but the production data are collected over a certain period of time (e.g., one year) and used for training the artificial neuronal network.

According to a further preferred embodiment of the invention, the product properties predicted serve to classify the quality of the foam produced. For example, the qualities predicted are stored in a databank.

According to another preferred embodiment of the invention, on the basis of the prediction of at least one product property, regions of lower quality of the foam produced are identified. Such regions are cut out of the foam block. Compared with the prior art, this has the advantage that less waste material is produced.

For example, in a continuous slabstock foam, production blocks of 6 m length are conventionally cut out of the foam strand. In the prior art, the individual blocks are then subjected to quality testing. In contrast, the present invention allows regions of the foam strand which have been predicted as being of inferior quality to be cut out of the foam strand, so that blocks of, for example, 6 m length of a uniform predicted quality are obtained. Classification according to different quality levels is also possible.

Preferred embodiments of the invention are explained in more detail below with reference to the drawings.

FIG. 1 is a diagram of the principles of a preferred embodiment of the invention in a slabstock foam process in a continuous rectangular process by the Hennecke method.

Figure 2:
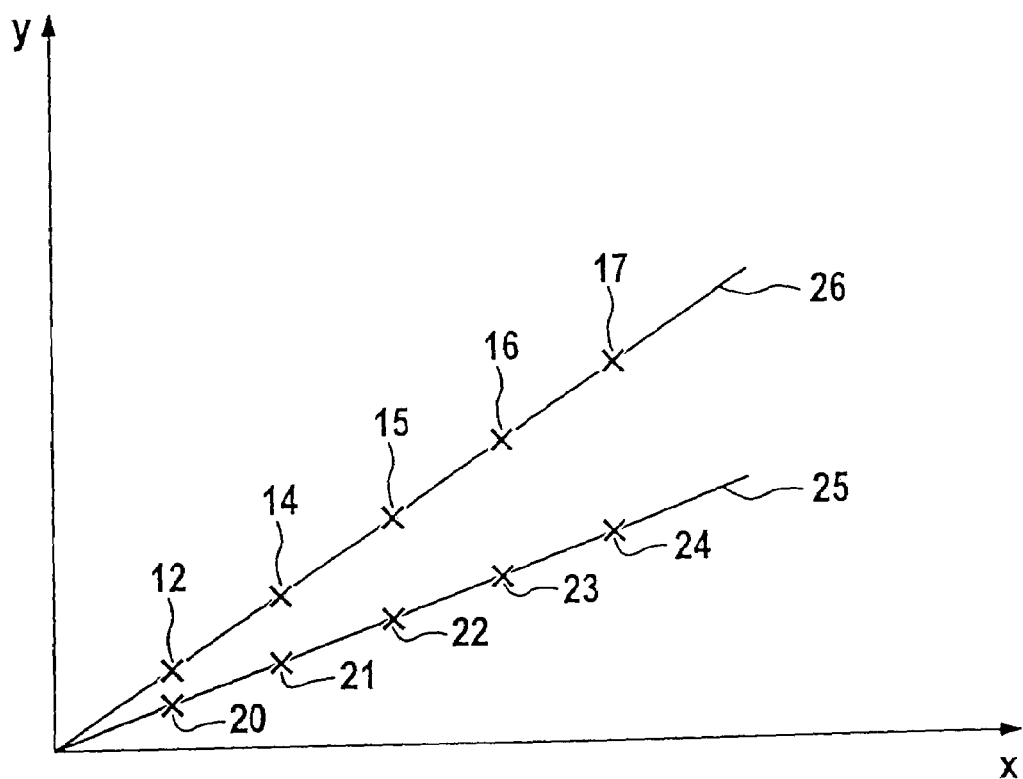
FIG. 2 is a graphical presentation of heights measured at various points during a foam production process and the "standard" height for a foam at those same points.

FIG. 2 is a diagram of actual heights risen and set heights to be risen (standard heights).

Figure 3:
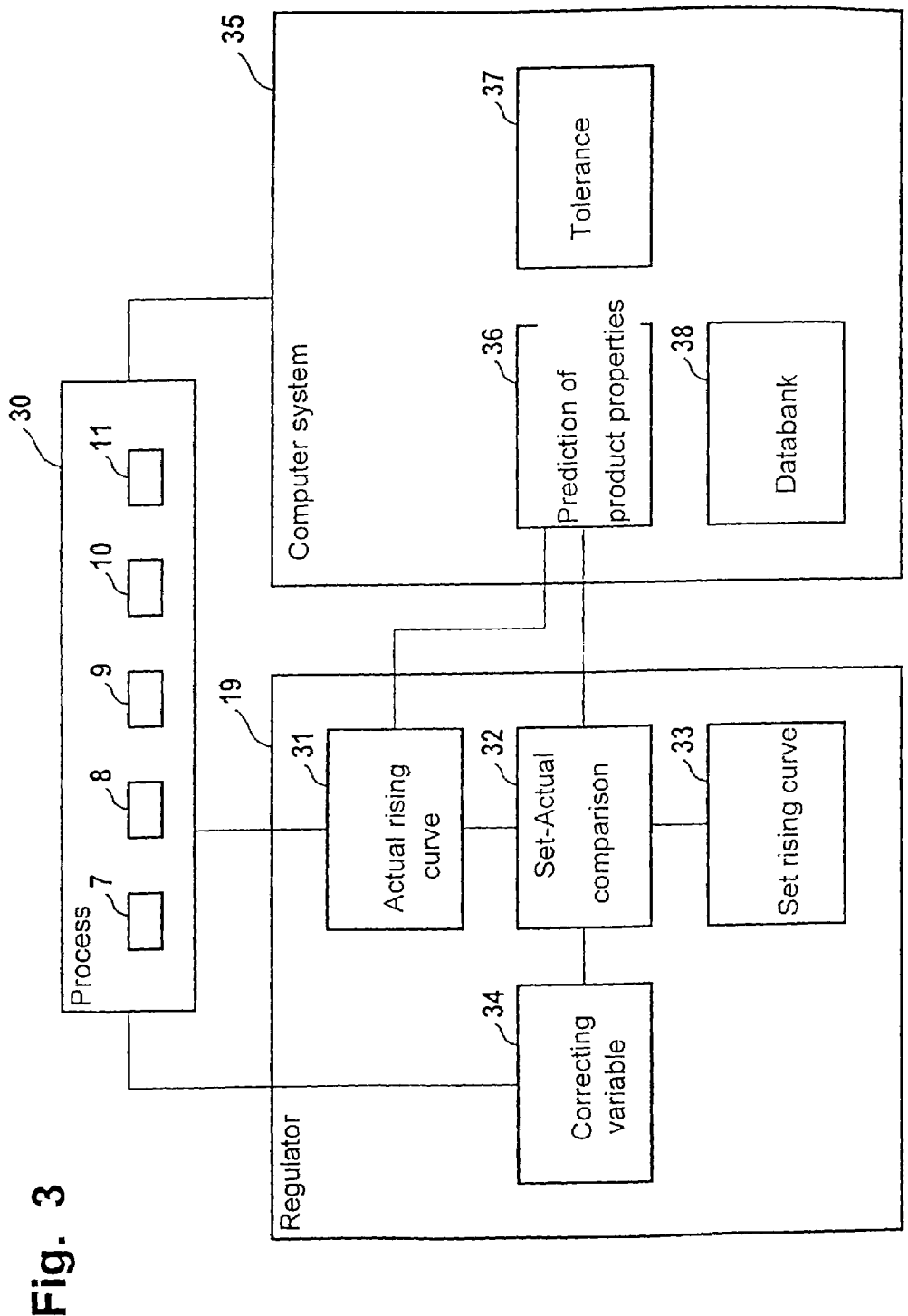
FIG. 3 is a block diagram for an installation within the scope of the present invention.

FIG. 3 is a block diagram of an embodiment of an installation according to the invention with a regulator and a computer system for prediction of product properties.

Figure 4:
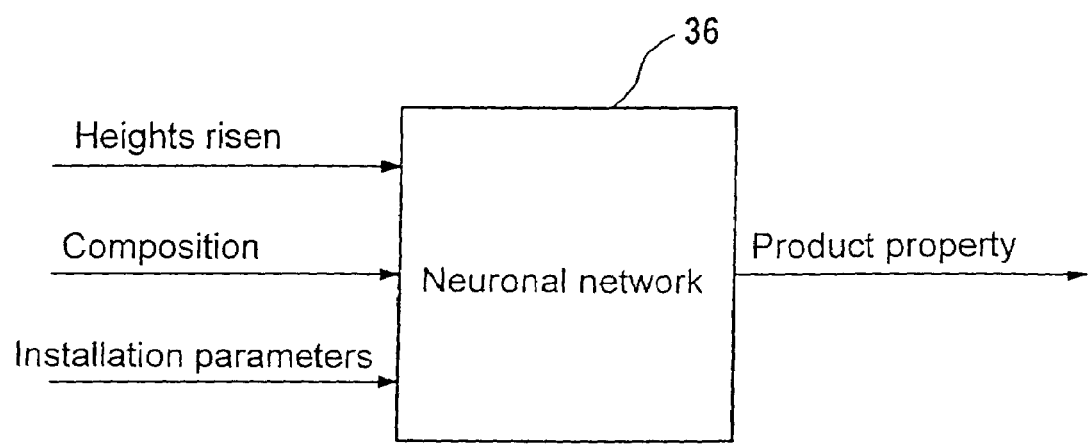
FIG. 4 illustrates an artificial neuronal network suitable for use in the installations of the present invention.

FIG. 4 illustrates an embodiment of a neuronal network for the computer system of FIG. 3.

Figure 5:
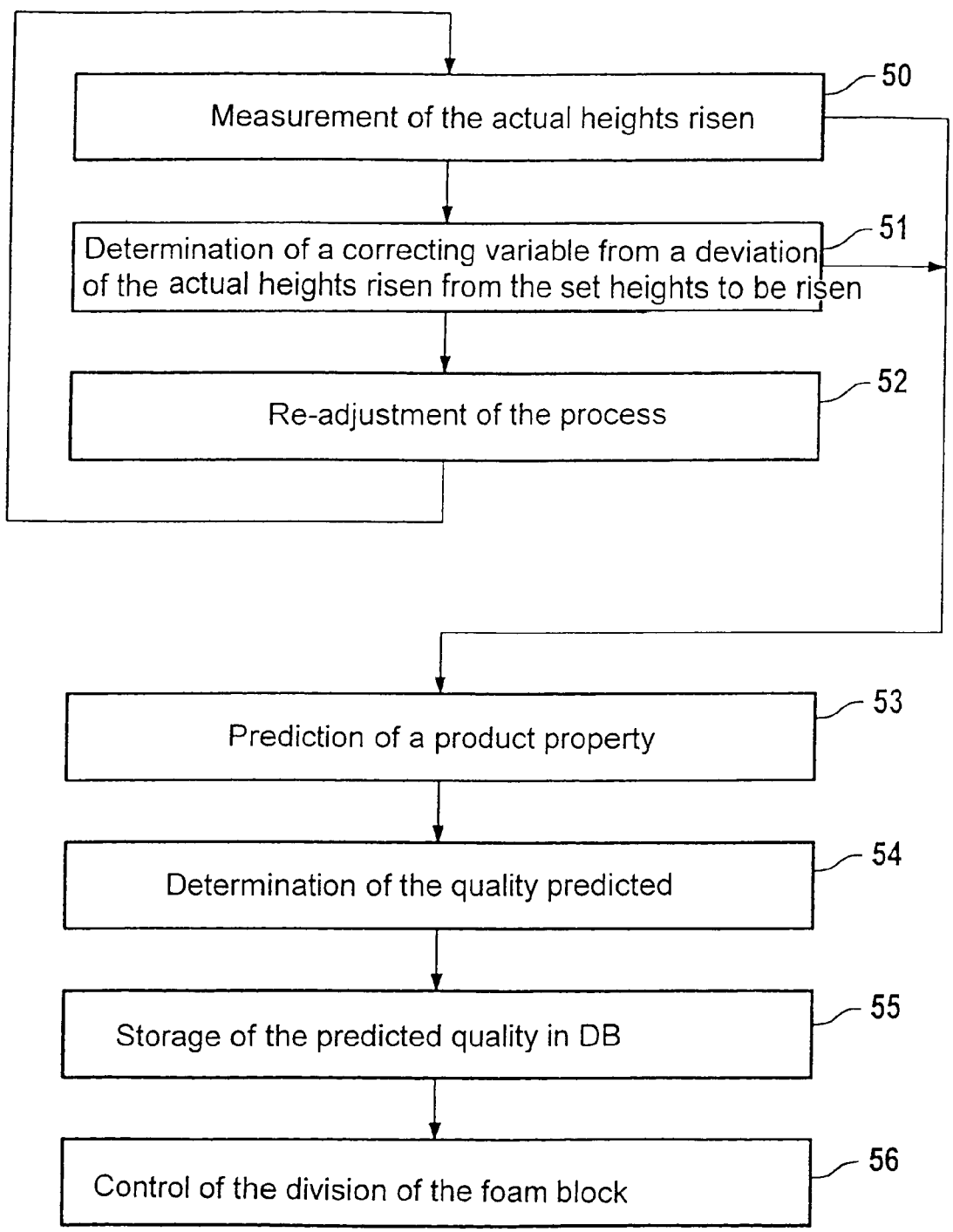
FIG. 5 is a flow chart for the operation of the installation of the present invention.

FIG. 5 is a flow chart for operation of the installation of FIGS. 3 and 4.

Figure 6:
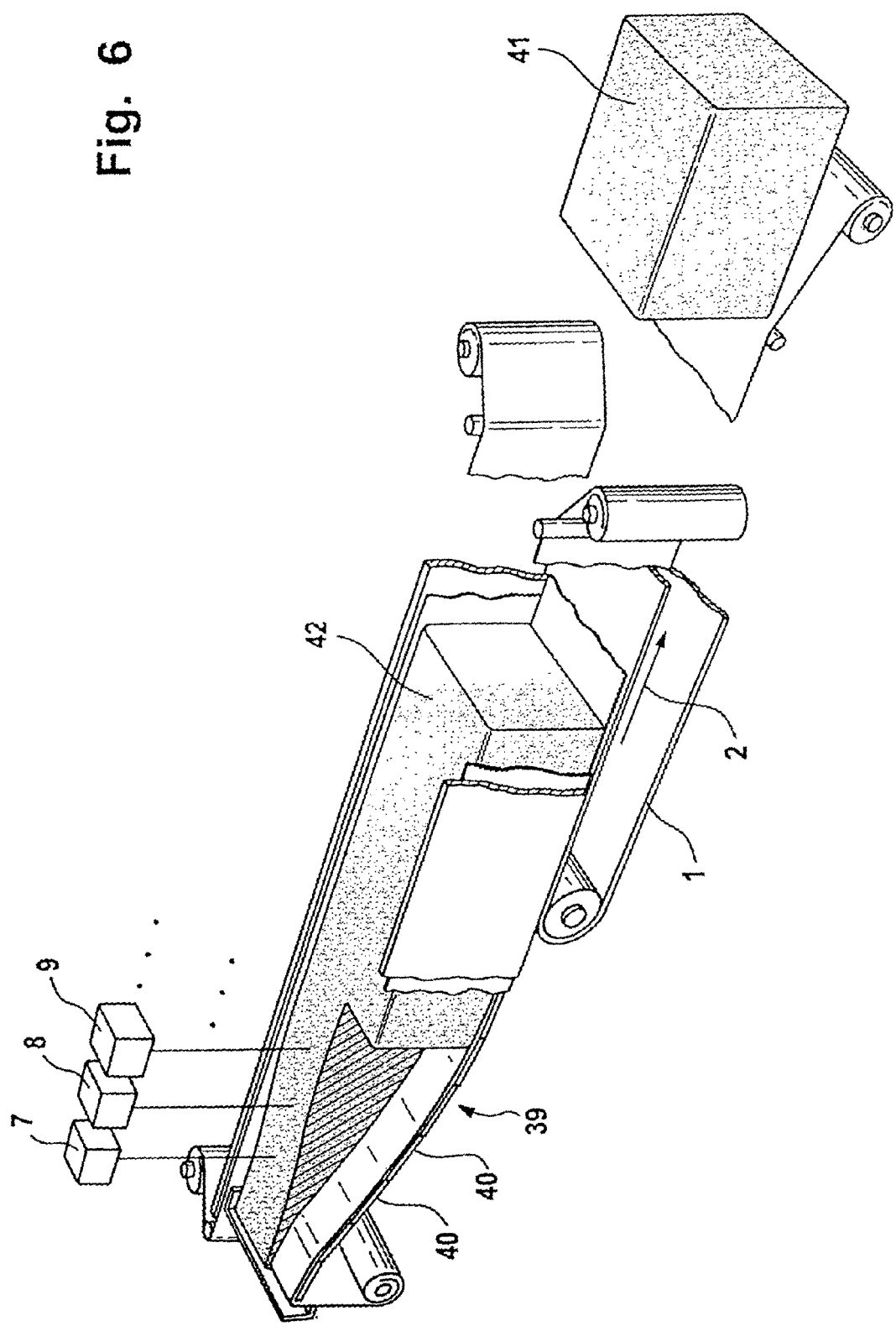
FIG. 6 illustrates another foam-forming apparatus which incorporates an installation within the scope of the present invention.

FIG. 6 illustrates a further embodiment of the invention in a slabstock foam process in a continuous Maxfoam rectangular process.

FIG. 1 illustrates an installation for the production of foam, in particular polyurethane foam, in a continuous slabstock foam process by a Hennecke Planibloc process. This installation has a conveyor belt 1 which is moved in the conveying direction 2. At the start of the conveyor belt 1 is a mixing head 3 above the conveyor belt 1. The mixing head 3 serves to apply a reactive chemical system to the surface of the conveyor belt 1. The reactive chemical system is a foaming mixture, for example for the production of polyurethane foam.

The reactive chemical mixture expands on the conveyor belt 1, so that an expansion region with expanding foam 4 is formed. Covering paper 5, which is fed via rolls 6, is applied to the foam surface.

Sensors 7, 8, 9, 10 and 11 are arranged above the expansion region. For example, sensor 7 serves to measure the height 12 risen by the foam. For this, depending on the sensor principle used, the height 12 risen is determined either directly or indirectly via the distance 13 between the sensor 7 and the surface of the expanding foam 4. The heights 14, 15, 16 and 17 risen are determined accordingly by means of the sensors 8, 9, 10 and 11.

The sensors 7, 8, 9, 10 and 11 are each connected to a bus system 18. The bus system 18 is connected to a regulator 19. The regulator 19 thus receives via the bus system 18 the measurement signals of the sensors 7, 8, 9, 10 and 11. On the basis of these measurement signals, the regulator 19 determines a correcting variable for re-adjustment of the slabstock foam process. For example, the speed of the conveyor belt 1 and/or the amount of reactive chemical system fed via the mixing head 3 per unit time and/or the chemical composition of the system serve as the correcting variable.

FIG. 2 shows a diagram of the actual heights risen which have been determined in comparison with given set heights to be risen which can occur, e.g., in an installation with a fall plate, e.g. MaxFoam. The actual heights 12, 14, 15, 16 and 17 risen are shown in a coordinate system. The x-axis here corresponds to the conveying direction 2 and the y-axis to the height risen.

The set heights 20, 21, 22, 23 and 24 to be risen are furthermore shown in the coordinate system. Instead of discrete set heights to be risen, a rising contour can also be set in the form of a curve 25.

To carry out the regulation, the difference between the actual heights risen and the set heights to be risen is evaluated. This can be achieved, for example, by laying a fitted curve 26 through the actual heights 12, 14, 15, 16 and 17 risen which are determined by measurement. This can be a fitted line or a polynomial, e.g., a spline polynomial, or wavelets.

To determine a correcting variable, for example, the different gradients of the curves 25 and 26 can be used, that is to say the difference between the gradient of the curve 25 and the gradient of the curve is obtained. This difference in the gradient is a measure of the deviation of the actual heights risen from the set heights to be risen.

Alternatively or in addition, for example, the integral of the curve 25 and the integral of the curve 26 can be obtained. The difference between the two integrals again results in a measure of the deviation of the actual heights risen from the set heights to be risen.

Alternatively or in addition, characteristic points or points of inflection of the actual and set curves can also be used for determination of a correcting parameter. In installation types without a fall plate, an S-shaped curve with a further point of inflection in the region of the blowing off of the foam is typically obtained. These two points of inflection can be used for determination of the correcting variable.

On the basis of the deviation of the actual heights risen from the set heights to be risen, a correcting variable is thus determined for re-adjustment of the slabstock foam process. In the example of FIG. 2 shown, for example, the speed of the conveyor belt 1 (FIG. 1) can be increased in order to reduce the actual heights risen at the measurement positions of the sensors 7, 8, 9, 10 and 11 along the conveying direction 2. Alternatively or in addition, the amount of reactive chemical system applied by the mixing head 3 per unit time can also be reduced in order to reduce the actual heights risen. Alternatively or in addition, the composition of the reactive chemical system can furthermore be modified such that it foams more slowly, in order thus to reduce the actual heights risen at the measurement positions.

A tilting of the fall plate of the installation can furthermore also be used as the correcting variable. For example, if an actual height risen is below the set height to be risen, one or more segments of the fall plate may be adjusted accordingly, so that, for example, the tilt of the fall plate is reduced.

The temperature of the material fed to the mixing head can furthermore be used as the correcting variable. For this purpose, flow-through heaters are preferably provided in the feed lines to the mixing head in order to regulate the temperature of the components fed to the mixing head.

The spray pressure of the components into the mixing head is furthermore also suitable as a correcting variable. The spray pressure is the pressure with which the individual components are injected into the mixing head. Alternatively or in addition, the pressure prevailing in the mixing head can also serve as the correcting variable. The regulation is effected, for example, via a throttle at an outlet of the mixing head.

The speed of a mixer which serves to mix the components can be used as a further correcting variable. Such a mixer or stirrer is arranged, for example, in the mixing head. A typical speed range of the mixer is 2,000 to 5,000 revolutions per minute.

The amount of dissolved and/or dispersed gas in the components is possible as a further correcting variable.

FIG. 3 shows a block diagram of an installation according to the invention. Elements of FIG. 1 which correspond to elements in FIG. 3 are in each case identified with the same reference symbol.

In the installation, the production of foam takes place in a continuous slabstock foam process 30, for example, in a continuous rectangular process by the Hennecke or Maxfoam process. The sensors 7, 8, 9, 10 and 11 are arranged in the installation as shown in FIG. 1.

The process 30 is regulated via the regulator 19. The regulator 19 comprises a module 31 for determination of the actual rising curve (curve 26 of FIG. 2). The regulator 19 furthermore comprises a module 32 for comparison of the actual rising curve determined in module 31 with a set rising curve (curve 25 of FIG. 2) stored in a module 33. In the module 32, a measurement number which indicates a measure of the deviation of the actual from the set rising curve is calculated. This measurement number is entered into the module 34, which serves to determine a correcting variable for re-adjustment of the process 30.

The installation furthermore has a computer system 35, with a module 36 for prediction of at least one product property of the foam produced, a table 37 for classification of the predicted quality of the foam produced, and a databank 38. The quality of the predicted product quality in the longitudinal direction of the slabstock foam can be stored in the databank 38, that is to say for a particular point of the slabstock foam in the x-direction the predicted product quality is stored in the databank 38.

The computer system 35 receives as the input parameter the actual rising curve determined by the module 31, which is entered into the module 36. Alternatively, only the actual heights risen are entered. Furthermore, the measurement number determined in the module 32, which indicates the extent of the deviation between the actual and the set rising curve, can also be entered into the computer system 35.

On the basis of these input values, one or more product properties of the foam currently produced are predicted in the module 36. The product properties predicted can be, for example, the density and the compressive strength.

Classification of the quality by access to table 37 then takes place by means of the product properties predicted. Permitted tolerance values for the product properties according to the product quality are stored in table 37.

The product properties predicted and the assigned qualities are then deposited in the databank 38 for the foam currently produced.

The continuous slabstock foam resulting from the process 30 is conventionally divided into block of, for example, 6 m length. For this purpose, the process 30 comprises a cutting device. This cutting device is preferably controlled by the computer system 35. If the computer system 35 predicts a relatively short section of the slabstock foam with a lower quality, this is cut out of the slabstock foam by controlling the cutting device in the process 30. The waste of the process 30 can be reduced in this manner.

FIG. 4 shows an embodiment of the prediction module 36 of FIG. 3. This embodiment is an artificial neuronal network. The input parameters of the artificial neuronal network are the actual heights risen (the heights 12, 14, 15, 16, 17 risen of FIGS. 1 and 2), the composition of the reactive chemical system which is applied to the conveyor belt 1 by the mixing head 3 (FIG. 1) and installation parameters, such as, for example, pressures and temperatures, and preferably also environmental parameters, such as, for example, the atmospheric pressure and the atmospheric humidity.

From these input parameters, the artificial neuronal network predicts one or more product properties.

The training data required for training the artificial neuronal network can be obtained by separate series of experiments or by recording data of a current production.

FIG. 5 illustrates the process according to the invention by means of a flow chart. The actual heights risen in an expansion region of the foam in the slabstock foam process are first measured in step 50. A correcting variable for re-adjustment of the slabstock foam process is determined from a deviation of the actual heights risen from the set heights to be risen in step 51. The process is re-adjusted accordingly in step 52. Thereafter, measurement of the actual heights risen is carried out again in step 50 for progressive regulation of the slabstock foam process.

A product property is predicted from the actual heights risen and/or from the correcting variable in step 53. A quality class is predicted in step 54 from the product properties predicted. This is stored in a databank in step 55. In step 56, the division of the slabstock foam is controlled according to the quality predicted, so that, for example, sections of the slabstock foam of lower quality are cut out in order to achieve large cohesive blocks of high quality.

FIG. 6 shows an alternative embodiment of the invention in an installation which operates by a Maxfoam process. Elements of FIG. 6 which correspond to elements of FIG. 1 are identified with the same reference symbols.

In contrast to the embodiment of FIG. 1, the conveyor belt 1 in the embodiment of FIG. 6 precedes the expansion region in the form of a fall plate 39. The fall plate is divided into segments 40, which are adjusted such that they approximately imitate the contour of the expanding foam 4. The upper side of the expanding foam is therefore approximately flat.

The surface of the expanding foam 4 is scanned in the expansion region by the sensors 7, 8, 9, . . . , in order to determine the particular actual heights risen. This should as far as possible be zero, since the expansion after all takes place down-wards into the contour described by the fall plate 39. In this embodiment example, the regulation thus takes place such that the surface of the expanding foam recorded by the sensors 7, 8, 9, . . . is as far as possible flat.

FIG. 6 furthermore shows a foam block 41 which is cut out of the slabstock foam and is obtained by dividing up the slabstock foam 42.

| List of reference symbols | |
|---|---|
| Conveyor belt | 1 |
| Conveying direction | 2 |
| Mixing head | 3 |
| Expanding foam | 4 |
| Covering paper | 5 |
| Rolls | 6 |
| Sensor | 7 |
| Sensor | 8 |
| Sensor | 9 |
| Sensor | 10 |
| Sensor | 11 |
| Height risen | 12 |
| Distance | 13 |
| Height risen | 14 |
| Height risen | 15 |
| Height risen | 16 |
| Height risen | 17 |
| Bus system | 18 |
| Regulator | 19 |
| Set height to be risen | 20 |
| Set height to be risen | 21 |
| Set height to be risen | 22 |
| Set height to be risen | 23 |
| Set height to be risen | 24 |
| Curve | 25 |
| Curve | 26 |
| Process | 30 |
| Module | 31 |
| Module | 32 |
| Module | 33 |
| Module | 34 |
| Computer system | 35 |
| Module | 36 |
| Table | 37 |
| Databank | 38 |
| Fall plate | 39 |
| Segment | 40 |

-continued

| List of reference symbols | |
|---|---|
| Foam block | 41 |
| Slabstock foam | 42 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process for the production of slabstock foam comprising:
   a) depositing foam-forming mixture onto a moving conveyor,
   b) measuring actual height risen by the foam-forming mixture along the conveyor at three or more points alone the moving conveyor where the foam-forming mixture is expanding,
   c) determining a correcting variable as a function of difference between actual height risen at the measuring points and corresponding height to which the foam is set to rise at each of those measuring points, and
   d) adjusting the process using the correcting variable.

2. The process of claim 1 in which the foam-forming mixture is a polyurethane foam-forming mixture.

3. The process of claim 1 in which the foam-forming mixture reacts to produce a flexible polyurethane foam.

4. The process of claim 1 in which a conveying device with a conveyor belt which is driven in the conveying direction is used.

5. The process of claim 4 in which the conveying device has a fall plate.

6. The process of claim 1 in which the actual height risen is recorded by one or more height sensors arranged along the conveying direction.

7. The process of claim 1 in which conveying speed serves as the correcting variable.

8. The process of claim 1 in which adjustment of the fall plate serves as the correcting variable.

9. The process of claim 1 in which amount of foam-forming mixture per unit time serves as the correcting variable.

10. The process of claim 1 in which chemical composition of the foam-forming mixture serves as the correcting variable.

11. The process of claim 1 in which temperature of the foam-forming mixture serves as the correcting variable.

12. The process of claim 11 in which the temperature is regulated by at least one flow-through heater arranged in mixing head feed lines.

13. The process of claim 1 in which spray pressure of the foam-forming mixture components into a mixing head serves as the correcting variable.

14. The process of claim 1 in which pressure in a mixing head serves as the correcting variable.

15. The process of claim 14 in which the pressure in the mixing head is regulated via a throttle at the mixing head outlet.

16. The process of claim 1 in which speed of a mixer for the foam-forming mixture components serves as the correcting variable.

17. The process of claim 1 in which amount of dissolved and/or dispersed gas in the foam-forming mixture components serves as the correcting variable.

18. The process of claim 1 in which at least one foam product property in a certain region along the conveyor is predicted as a function of the actual height risen.

19. The process of claim 18 in which the prediction of at least one product property is effected by means of a regression model.

20. The process of claim 18 in which the prediction is effected by means of an artificial neuronal network or hybrid artificial neuronal network.

21. The process of claim 20 in which actual height risen is entered into the artificial neuronal network as an input parameter.

22. The process of claim 18 in which the predicted product property is used to classify the quality of the foam product.

23. The process of claim 22 in which any low quality region of the foam product is cut out.

24. An installation for the production of slabstock foam in a continuous process comprising:
   a) means for determining actual height risen by a foam-forming mixture along a conveyor at three or more points along the moving conveyor where the foam-forming mixture is expanding,
   b) means for determining a correcting variable for the process as a function of difference between actual height risen at the measuring points from height to which the foam is set to rise at each of those measuring points.

25. The installation of claim 24 in which the foam product produced is a flexible polyurethane foam.

26. The installation of claim 24 in which the conveyor has a conveyor belt driven in the conveying direction.

27. The installation of claim 24 having a fall plate.

28. The installation of claim 24 in which the means for recording actual height risen has at least one height sensor arranged along the conveying direction.

29. The installation of claim 24 in which the means for determining the correcting variable is a means for determining conveying speed.

30. The installation of claim 24 in which the means for determining the correcting variable is a means for determining tilt of a fall plate.

31. The installation of claim 24 in which the means for determining the correcting variable is a means for determining amount of foam-forming mixture fed per unit time.

32. The installation of claim 24 in which the means for determining the correcting variable is a means for determining chemical composition of the foam-forming mixture.

33. The installation of claim 24 in which the means for determining the correcting variable is a means for determining spray pressure of foam-forming mixture components in a mixing head.

34. The installation of claim 24 in which the means for determining the correcting variable is a means for determining pressure in a mixing head.

35. The installation of claim 34 in which the pressure in the mixing head can be regulated via a throttle at an outlet of the mixing head.

36. The installation of claim 24 in which the means for determining the correcting variable is a means for determining speed of a mixer for the foam-forming mixture components.

37. The installation of claim 36 in which the mixer is arranged in the mixing head.

38. The installation of claim 24 in which the means for determining the correcting variable is a means for determining amount of dissolved and/or dispersed gas in the foam-forming mixture.

39. The installation of claim 24 in which the means for determining the correcting variable is a means for determining temperature of the foam-forming mixture.

40. The installation of claim 39 in which a flow-through heater is provided in feed lines to a mixing head for regulation of the temperature.

41. The installation of claim 24 in which means for prediction of least one product property of foam as a function of actual height risen is positioned along the conveyor.

42. The installation of claim 41 in which the means for predicting uses a regression model.

43. The installation of claim 41 in which the means for predicting is an artificial neuronal network or hybrid artificial neuronal network.

44. The installation of claim 41 further comprising means for controlling a cutting device for dividing the foam into blocks having a predicted product property.

* * * * *